Patented July 5, 1938

2,123,082

UNITED STATES PATENT OFFICE 2,123,082

MANUFACTURE OF ALKYL SULPHUR HALIDES

Walter A. Schulze, Bartlesville, Okla., assignor to Phillips Petroleum Company, a corporation of Delaware No Drawing. Application July 23, 1935, Serial No. 32,802

8 Claims. (Cl. 260—99.10)

This invention relates to the preparation of new organic sulphur compounds termed herein alkyl sulphur halides. These compounds have the general formula R—S—X wherein the radical R is an alkyl group and X is a halogen.

Prior to this time only the aryl sulphur chlorides and bromides have been prepared, for example phenyl sulphur chloride ($C_6H_5SCl$). All attempts to prepare the alkyl derivatives have been unsuccessful, due to the great differences in properties of the aryl and alkyl groups.

I have found now that certain of these alkyl sulphur halides can be prepared by the methods described below. Such compounds are particularly useful as intermediates in the manufacture of the more complex organic sulphur compounds, hence a means of preparation represents a notable advance in the art of sulphur chemistry.

According to my invention the tertiary alkyl sulphur chlorides can be prepared by dissolving the respective mercaptans in an inert solvent and then treating with an alkaline hypochlorite solution. The reaction for the tertiary butyl derivative is shown below.

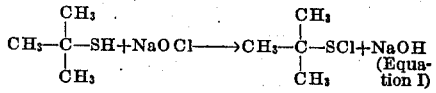

Tertiary-butyl mercaptan     Tertiary-butyl sulphur chloride

A typical preparation of the tertiary butyl sulphur chloride is as follows: 50 cc. of tertiary butyl mercaptan is added to 1000 cc. of pentane. The pentane solution is then immediately agitated for a few seconds with about 500 cc. of a strong solution of sodium hypochlorite. Finally, the pentane solution containing the butyl sulphur chloride is separated from the treating agent. If the tertiary butyl sulphur chloride is to be used as an intermediate in the preparation of some other compound it may be used in this pentane solution, or in case it is desired in a concentrated state the pentane may be removed by distillation, preferably at low temperatures and sub-atmospheric pressures.

As might be expected these alkyl sulphur chlorides such as the tertiary butyl have strong oxidizing properties. They can be used, for example to oxidize additional quantities of mercaptans to disulphides. The reaction is expressed as follows:

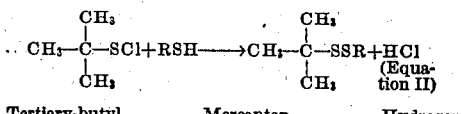

Tertiary-butyl    Mercaptan    Hydrogen
sulphur chloride   disulphide    chloride In the preparation of the butyl sulphur chloride as shown in the example, the reaction of the mercaptan with hypochlorite takes place much more rapidly than the reaction of the butyl sulphur chloride with additional mercaptan. Therefore, it is possible under the conditions stated to obtain a quantitative yield of the tertiary butyl sulphur chloride. It is evident, of course, from this disclosure that an excess of mercaptan, or highly concentrated solutions of mercaptan, tend to reduce the percentage yield of the sulphur chloride compound through its reaction with unused mercaptans to form disulphide.

The tertiary butyl sulphur bromide may be prepared in a manner analogous to that of the chloride by substituting a solution of bromine water or an alkaline hypobromite for the alkaline hypochlorite solution. The corresponding iodide may be made directly with iodine or with an aqeuous solution of iodine in an alkaline iodide.

The other teritary alkyl mercaptans, such as tertiary amyl, react like the butyl to form the corresponding alkyl sulphur chlorides in quantitative yield.

In the treatment of secondary mercaptans with hypochlorite solutions, the same reactions take place as those indicated above for the tertiary mercaptans. However, the reaction of this sulphur chloride compound with the unconverted mercaptan (Equation II) is considerably more rapid than in the case of the tertiary compound and the yield of the alkyl sulphur chloride is thereby cut down. The usual means for increasing the yield of the primary reaction products can be employed here. Higher yields can be more readily obtained with the bromides and iodides than with the chlorides.

The solvent for the mercaptan may be a low boiling hydrocarbon such as the pentane mentioned above, benzene, chloroform, carbon tetrachloride or other inert solvents. Since the solvent acts principally as a diluent it can be dispensed with entirely if appropriate measures are taken to prevent the first formed sulphur halide from reacting with additional mercaptan before the latter has had a chance to be converted to the sulphur halide. For example, the mercaptan may be vaporized in a stream of inert gas and the gas bubbled through a hypochlorite solution.

Examples of the ways in which these alkyl sulphur halides will react with ammonia and amines are shown by the equations:

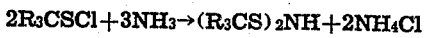

Alkyl polysulphides may be formed through the interaction of the alkyl sulphur halides and alkali polysulphides, e. g., treatment of the tertiary butyl sulphur chloride with a sodium polysulphide solution.

While I have thus specifically described my invention, various modifications thereof may suggest themselves to those skilled in the art, and it is therefore my intention that the invention be limited only by the scope of the appended claims.

I claim:

1. As a new product, a compound of the general formula R—S—X wherein R is an unsubstituted alkyl group and X is a halogen.

2. As a new product, a compound of the general formula R—S—X wherein R is a tertiary alkyl group and X is a halogen.

3. As a new product, tertiary butyl sulphur chloride.

4. The process of preparing alkyl sulphur halides, which comprises introducing a solution of an alkyl mercaptan selected from the group consisting of the secondary and tertiary alkyl mercaptans in an inert solvent into a large excess of an alkaline hypohalite solution, whereby a substantial proportion of the alkyl mercaptan is converted to the corresponding alkyl sulphur halide, and separating the solvent containing the alkyl sulphur halide from the hypohalite solution.

5. The process of preparing tertiary alkyl sulphur chloride, which comprises treating the corresponding tertiary alkyl mercaptan in an inert solvent with an excess of an alkaline hypochlorite solution, whereby the tertiary alkyl mercaptan is substantially completely converted to the corresponding tertiary alkyl sulphur chloride, and separating the solvent containing the said sulphur chloride from the hypochlorite solution.

6. The process of preparing tertiary butyl sulphur chloride, which comprises introducing a solution of tertiary butyl mercaptan in an inert solvent which is substantially immiscible with water into an excess of an alkaline hypochlorite solution, whereby the tertiary butyl mercaptan is substantially completely converted into the tertiary butyl sulphur chloride, separating the solvent containing the said sulphur chloride from the hypochlorite solution, and finally removing the solvent from the tertiary butyl sulphur chloride.

7. The process of preparing an alkyl sulphur halide, comprising vaporizing an alkyl mercaptan selected from the group consisting of the secondary and tertiary alkyl mercaptans in a stream of inert gas, passing the mixture of said mercaptan and inert gas through an alkaline hypohalite solution, whereby the alkyl sulphur halide is formed from the said mercaptan, and separating the alkyl sulphur halide from the hypohalite solution.

8. The process of preparing tertiary butyl sulphur chloride, comprising vaporizing tertiary butyl mercaptan in a stream of inert gas, passing the gaseous mixture of said mercaptan and inert gas through an alkaline hypochlorite solution, whereby the said mercaptan is substantially completely converted to tertiary butyl sulphur chloride, and separating the said sulphur chloride from the hypochlorite solution.

WALTER A. SCHULZE.